(12) United States Patent
Goldstein

(10) Patent No.: US 7,185,206 B2
(45) Date of Patent: Feb. 27, 2007

(54) METHODS FOR TRANSMITTING DIGITIZED IMAGES

(76) Inventor: Neil M. Goldstein, 5 Meadow Wood Cir., Pittsford, NY (US) 14534

( * ) Notice: Subject to any disclaimer, the term of this patent is extended or adjusted under 35 U.S.C. 154(b) by 678 days.

(21) Appl. No.: 10/427,339

(22) Filed: May 1, 2003

(65) Prior Publication Data

US 2004/0247123 A1 Dec. 9, 2004

(51) Int. Cl.
*G06F 1/26* (2006.01)
(52) U.S. Cl. .................. 713/189; 713/193; 726/15; 726/17; 726/28
(58) Field of Classification Search ........ 713/189–193; 726/15, 17, 28
See application file for complete search history.

(56) References Cited

U.S. PATENT DOCUMENTS

| | | | |
|---|---|---|---|
| 4,628,356 A | 12/1986 | Spillman et al. | |
| 4,649,559 A | 3/1987 | Wang | |
| 4,702,593 A | 10/1987 | Detsch | |
| 4,878,234 A * | 10/1989 | Pfeiffer et al. | 378/40 |
| 5,177,775 A | 1/1993 | Onodera et al. | |
| 5,202,932 A | 4/1993 | Cambier et al. | |
| 5,241,406 A | 8/1993 | Johnston et al. | |
| 5,270,530 A | 12/1993 | Godlewski et al. | |
| 5,381,245 A | 1/1995 | Johnston et al. | |
| 5,384,862 A | 1/1995 | Echerer et al. | |
| 5,410,144 A | 4/1995 | Lavelle et al. | |
| 5,420,441 A | 5/1995 | Newman et al. | |
| 5,434,418 A * | 7/1995 | Schick | 250/370.11 |
| 5,454,022 A * | 9/1995 | Lee et al. | 378/98.8 |
| 5,584,292 A | 12/1996 | Cheung | |
| 5,737,388 A | 4/1998 | Kossila | |
| 5,740,267 A | 4/1998 | Echerer et al. | |
| 5,825,845 A | 10/1998 | Blair et al. | |
| 5,894,584 A | 4/1999 | Eckhaus | |
| 5,898,790 A | 4/1999 | Laurence | |
| 5,920,604 A | 7/1999 | Laupper et al. | |
| 5,995,138 A | 11/1999 | Beer et al. | |
| 6,188,501 B1 | 2/2001 | Neushul | |
| 6,292,535 B1 | 9/2001 | Williams et al. | |
| 6,292,596 B1 | 9/2001 | Snyder et al. | |
| 6,339,633 B1 | 1/2002 | Hull et al. | |
| 6,424,699 B1 | 7/2002 | Weinger | |
| 6,428,322 B1 | 8/2002 | Tanaka | |
| 6,483,893 B1 | 11/2002 | Achtnig et al. | |
| 6,497,511 B1 | 12/2002 | Schmitt et al. | |
| 6,502,985 B1 | 1/2003 | Garland et al. | |
| 2002/0007294 A1 | 1/2002 | Bradbury et al. | |
| 2002/0059049 A1 | 5/2002 | Bradbury et al. | |
| 2002/0067407 A1 | 6/2002 | Cooper | |
| 2002/0094119 A1 | 7/2002 | Sahadevan | |
| 2003/0007594 A1 | 1/2003 | Ganin | |
| 2003/0007602 A1 | 1/2003 | Sonobe et al. | |
| 2003/0007675 A1 | 1/2003 | Schmidt et al. | |

FOREIGN PATENT DOCUMENTS

WO    WO 98/20456 A1    5/1998

* cited by examiner

*Primary Examiner*—Thomas Peeso
(74) *Attorney, Agent, or Firm*—Hiscock & Barclay, LLP

(57) ABSTRACT

Methods for transmitting digitized x-ray radiographs are disclosed. Digitization may be carried out through use of a digital camera or through digital radiography. After digitization is complete, in certain embodiments of the present invention, the digitized x-ray radiograph is encrypted. In other embodiments, a virtual private network is established. In still other embodiments, either before or after generating a digitized x-ray image, written notice to a human subject concerning the identity of one or more authorized intended recipients may be provided. All embodiments include transmission of the digitized x-ray radiograph.

15 Claims, 2 Drawing Sheets

METHODS FOR TRANSMITTING DIGITIZED IMAGES

FIELD OF THE INVENTION

This invention relates generally to methods for transmitting digitized images, and more particularly to the transmission of digitized x-ray radiographs.

SUMMARY OF THE INVENTION

Methods for transmitting digitized x-ray radiographs are disclosed.

In one embodiment, the transmission method comprises the steps of generating a digital image of an x-ray radiograph, encrypting the digital image of the x-ray radiograph to create an encrypted digital image and transmitting the encrypted digital image.

In another embodiment, the transmission method comprises the steps of generating a digital image of an x-ray radiograph, establishing a virtual private network and transmitting the digital image of the x-ray radiograph over the virtual private network.

In yet another embodiment, the transmission method comprises the steps of generating a digital image of an x-ray radiograph showing features of a human subject, establishing one or more authorized intended recipients for transmission of the digital image of the x-ray radiograph, providing written notice to the human subject concerning at least one identity of the one or more authorized intended recipients and transmitting the digital image of the x-ray radiograph.

DETAILED DESCRIPTION

The present invention is useful for generating a digital image of an x-ray radiograph, including generating digital images of existing x-ray radiographs and/or capturing an x-rayed area in computer readable (digital) format through digital radiography. The digital image of the x-ray may be manipulated to comply with recently promulgated federal regulations under the Health Insurance Portability and Accountability Act (hereinafter "HIPAA").

An x-ray radiograph is a photograph obtained by use of x-rays or any radiograph made using forms of penetrating or reflected radiation directed through or reflected from a body or object having features not readily discernible from the exterior. The term x-ray radiograph includes both medical and dental x-ray radiographs. The purpose of radiographic photography is to ascertain information about the features within the body or object. The x-ray radiograph may contain an image having shades, ranging from black to white, or relative degrees of transparency, ranging from transparent to opaque.

An existing x-ray radiograph may be digitized by conventional methods known to those of skill in the art. For example, a high resolution digital scanner may be utilized. The output of the scanner is a computer readable format of the x-ray image. There are a number of suitable digital scanners, such as those available through Canon or Adara Technology. These systems typically have an 8 bit to 12 bit dynamic range. In another embodiment, a standard digital video camera may be used to digitize the existing x-ray radiograph.

In still other embodiments and as discussed more fully herein, a digital camera may be employed. A digital camera takes a still picture of existing x-rays, but does not require the development of film. The output of the digital camera is a computer readable representation of the x-ray radiograph. The digital camera may include a video capture mode feature. When the digital camera is in video capture mode, a live real-time continuous video image of the x-ray appears on the screen of the digital camera. By adjusting the position of the x-ray relative to the digital camera, the user may attempt to optimize the appearance of the x-ray's digital image. Examples of suitable digital cameras include, but are not limited to those offered by Olympus, Canon and Nikon.

Figure 1:
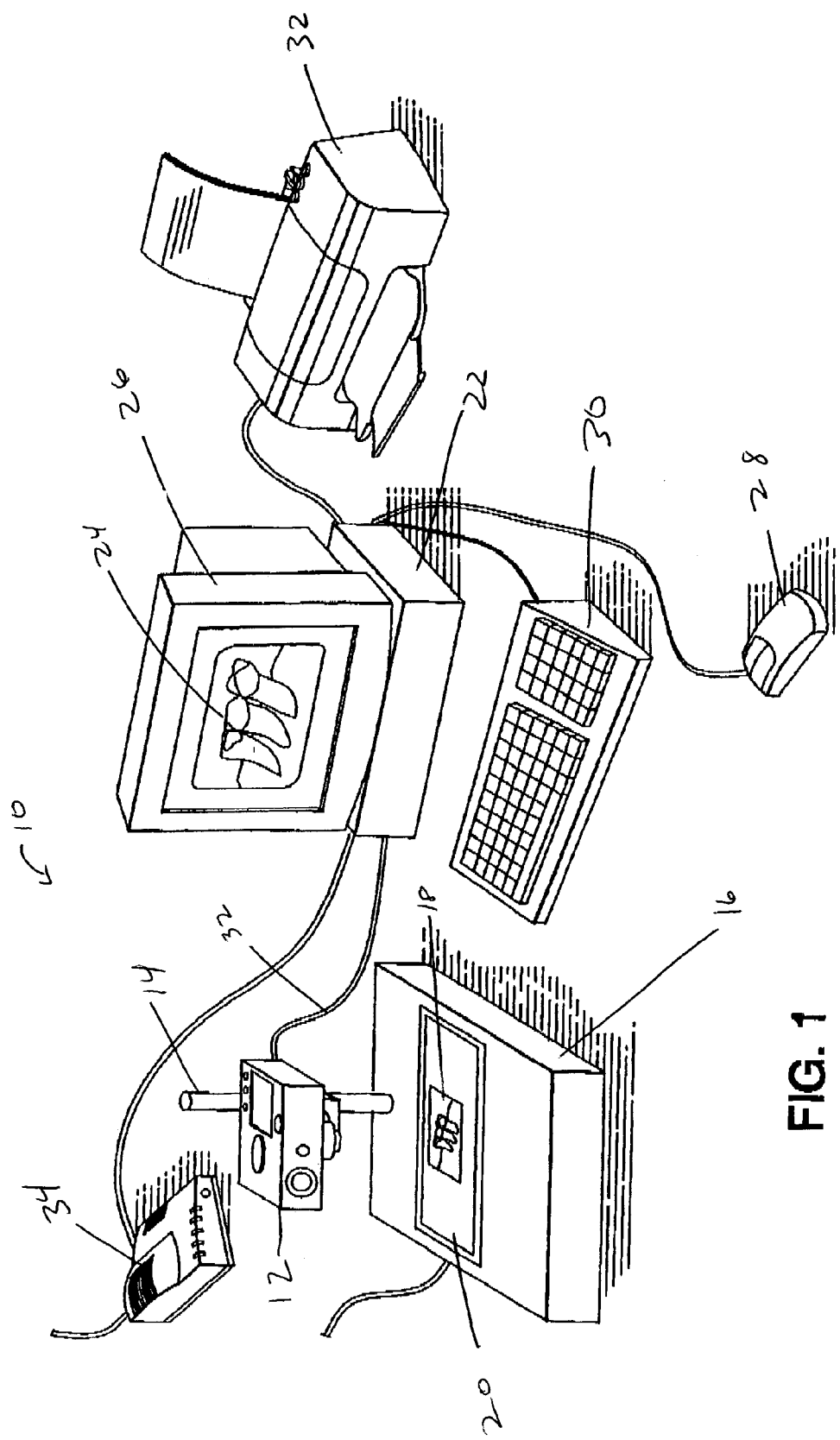
FIG. 1 is a perspective view of an apparatus for digitizing x-ray radiographs according to one embodiment of the presently claimed invention.

Referring now to FIG. 1, an apparatus 10 according to one embodiment of the presently claimed invention is shown. As illustrated in FIG. 1, a digital camera 12 is mounted to a post 14 over a light box 16 or on any other suitable means for illuminating a radiograph. The digital camera 12 may be attached to the post 14 with a universal male screw disposed on the post 14, which inserts into a universal female screw in all digital cameras 12. A single radiograph 18 or multiple radiographs are positioned on the transparent screen 20 of the light box 16. The digital camera 12 may be focused on all, or a portion of the radiograph 18, as desired.

The output of the digital camera 12, which includes a digital image 24 of the radiograph 18 is transmitted to a computer 22, which is connected to a monitor 26 for displaying the digital image 24. The computer 22 may also be connected to typical user interface devices, such as a mouse 28, keyboard 30 or other devices that enable the user to direct the efforts of the computer 22. The image 24 from the digital camera 12 may be transmitted directly to the computer 22, at the time of capture, by attaching a standard universal serial bus cable 32 from the digital camera 12 to the computer 22. Alternatively or additionally, the digital image 24 may be transmitted after capture by removing the digital camera 12 from the post 14 and associating it with the computer 22 to download its contents. After the digital image 24 is transmitted to the computer 22, it appears on the monitor 26 for review and optional manipulation.

In other embodiments, generating a digital image of an x-ray radiograph may be accomplished through the use of digital radiography, whereby an x-rayed area is captured in computer readable format. For example, a dental digital x-ray radiography system can capture a digitized image of a subject's teeth, and then immediately display it on a computer monitor.

With each of the above-described methods, a doctor or dentist may manipulate an image feature of the x-ray radiograph 18 on the computer monitor 26. For example, a "zoom" feature enables the user to select a portion of the digital image 24 to expand across the full screen of the monitor 26, making that portion larger for closer examination. When using a digital camera 12 to obtain a digital representation of an existing radiograph 18, "zoom" may be achieved by moving the camera 12 closer to the illuminated radiograph 18 or by using the zoom function of the camera lens. Other characteristics of the digital image 24, such as brightness, focus and contrast may be adjusted by methods known to those of skill in the art. Likewise, the image 24 may be cropped at the user's option.

In addition, through the use of standard drawing software, medical health professionals may create annotations directly on the digital image. Typical annotations include circles, text, highlights, arrows or any other objects to indicate areas of interest. In the case of a dentist, an annotation in the form of a circle around an extremely large area of decay would indicate the need for a root canal. Annotations may be inserted through use of the mouse 28, for example, by dragging a circle or arrow with the mouse and placing it over the appropriate portion of the image or by the keyboard 30 (for text).

After the digital image 24 has been transmitted to computer 22, it may be forwarded to remote sites. Transmitting the digital image of the x-ray radiograph to remote sites allows other physicians and/or insurance companies to assess patient health and potential diagnoses. In one embodiment, the digital image may be printed and sent via facsimile or regular mail to the remote site. Referring once again to FIG. 1, a printer 32 for producing a hard copy of the digital image 24 is provided. The printer 32 is connected by conventional means to computer 22. To ensure accurate representation of the digital image 24, the printer 32 should be a high quality laser printer. In another embodiment, the digital image may be emailed to the remote site. Through the use of a modem, which can be internal or external 34 to the computer 22 or other suitable means, the digital image may be emailed so that individuals located virtually anywhere in the world with email access can receive the digital image 24 of the x-ray radiograph 18. In addition, relevant medical records or histories can be sent with the digital image of the x-ray by any of the above-identified methods.

In another aspect of the presently claimed invention, preparation and transmission of the digital image complies with certain of the newly enacted HIPAA requirements regarding electronic medical and dental data. These new requirements empower patients by guaranteeing their access to medical records, affording them more control over how protected health information is used/disclosed and providing a clear avenue of recourse if medical privacy is comprised. Health providers must have either complied with the new HIPAA requirements on or before Oct. 16, 2002 or submitted a summary plan to the Secretary of Health and Human Services describing how they will come into full compliance with the standards by Oct. 16, 2003.

Because HIPAA now requires health providers to safeguard a patient's personal health information, certain embodiments of the presently claimed invention entail transmission of the digital image in a manner designed to accomplish that end. Two ways to safeguard patient health information are through the use of encryption or establishment of a virtual private network, "VPN" for short. Under either circumstance and in select embodiments, one or more authorized intended recipients may be established before transmission occurs. The one or more authorized intended recipients can be an individual or network of individuals authorized to view the digital image. More specifically, the one or more authorized intended recipients can be an individual, such as an insurance adjuster, a doctor or dentist or a group of individuals signed up with a particular insurance company or group with access rights to the digital image.

Encryption is the process of taking all of the data that one computer is sending to another and encoding it so as to prevent unauthorized access along the transmission line. There are a number of different ways to encrypt information to make it secure.

In symmetric-key encryption, each computer has a secret key (code) that it can use to encrypt a packet of information before it is sent to another computer. Symmetric-key encryption requires that you know which computers will be talking to each other so you can install the key on each one. This type of encryption is essentially the same as a secret code that each of the two computers must know in order to decode the information. The code provides the key to decoding the message.

Public-key encryption uses a combination of a private key and a public key. The private key is known only to one computer, while the public key is given by that computer to any computer that wants to communicate securely with it. To decode an encrypted message, a computer must use the public key, provided by the originating computer, and its own private key. In one embodiment of the present invention, decryption or decoding of the encrypted message is limited to one or more authorized intended recipients. One public-key encryption utility is called Pretty Good Privacy (PGP) available from PGP Corporation of Palo Alto, Calif. (www.pgp.com). The PGP program allows you to encrypt almost anything.

To implement public-key encryption on a large scale, such as a secure Web server, digital certificates are necessary. A digital certificate is basically a bit of information that says that the Web server is trusted by an independent source known as a certificate authority. The certificate authority acts as a middleman that both computers trust. It confirms that each computer is in fact who it says it is, and then provides the public keys of each computer to the other. A popular implementation of this type of public-key encryption is the Secure Sockets Layer (SSL). Originally developed by Netscape, SSL is an Internet security protocol used by Internet browsers and web servers to transmit sensitive information. If a secure protocol is in use, typically, the "http" in the address line is replaced with "https" and/or a small padlock appears in the status bar at the bottom of the browser window.

Most systems use a combination of public-key and symmetry. When two computers initiate a secure session, one computer creates a symmetric key and sends it to the other computer using public-key encryption. The two computers can then communicate using symmetric-key encryption. After the session is finished, each computer discards the symmetric key used for that session. Any additional sessions require that a new symmetric key be created, and the process is repeated.

A VPN is a private network that uses a public network (usually the Internet) to connect remote sites or users together. Instead of using a dedicated, real-world connection such as leased line, a VPN uses virtual connections routed through the Internet from a private network to a remote site.

A well-designed VPN uses several methods for maintaining data security. A firewall provides a strong barrier between a private network and the Internet. Some VPN products, such as Cisco's 1700 routers can be upgraded to include firewall capabilities by running the appropriate Cisco Internet operating system on them. Encryption may (but not must) be used in the implementation of a VPN. In addition, an AAA (authentication, authorization and accounting) server may be employed for more secure access in a VPN environment. When a request to establish a session comes in from a dial-up client, the request is proxied to the AAA server. AAA then checks who you are (authentication), what you are allowed to do (authorization) and what you actually do (accounting).

Depending on the type of VPN (remote-access or site-to-site), certain components may be necessary to build a VPN. These include, but are not limited to, desktop software client for each remote user, dedicated hardware such as a VPN concentrator or a secure firewall, a dedicated VPN server for dial-up services, a network access server used by a service provider for remote-user VPN access and a VPN network and policy-management center. Because there is no widely accepted standard for implementing a VPN, however, many companies offer turn-key solutions. For example, Cisco offers several VPN solutions including, VPN Concentrator and Secure PIX Firewall. VPN concentrator incorporates the most advanced encryption and authentication techniques available and is built specifically for creating a remote-access VPN.

In addition to safeguarding a patient's personal health information, the new HIPAA regulations address a number of other privacy rights. These rights include the right to written notice of the health care provider's information practices, the right to request privacy protection, the right to inspect and copy information and the right to an accounting of disclosures. Thus, in select embodiments of the presently claimed invention, written notice to a human subject concerning the identity of one or more authorized intended recipients occurs prior to transmission of health information.

Health care providers, such as doctors and dentists, subject to HIPAA should provide individuals with notice of their privacy policies. Among other things, the notice should include: (1) a description of a purpose or purposes for which use or disclosure of protected health information will take place; (2) a statement that the covered entity is required by law to maintain the privacy of protected health information; and (3) the name of a contact person to receive complaints or provide additional information on privacy practices. Patients are also generally asked to sign or otherwise acknowledge receipt of the privacy notice. Protected health information includes x-ray radiographs and digitized images thereof.

Health care providers should also afford patients the right to inspect and copy their digital images. The provider is required to act on a request for access to records within 30 days and may charge reasonable fees for copying.

Further, patients may request extra protection of their medical records. In particular, patients may request restrictions on the use and disclosure of digital images to carry out treatment, payment or health care operations. Although there is no requirement that the provider honor the request, the provider must make the option available and maintain a paper or electronic record of the requested restriction.

Figure 2:
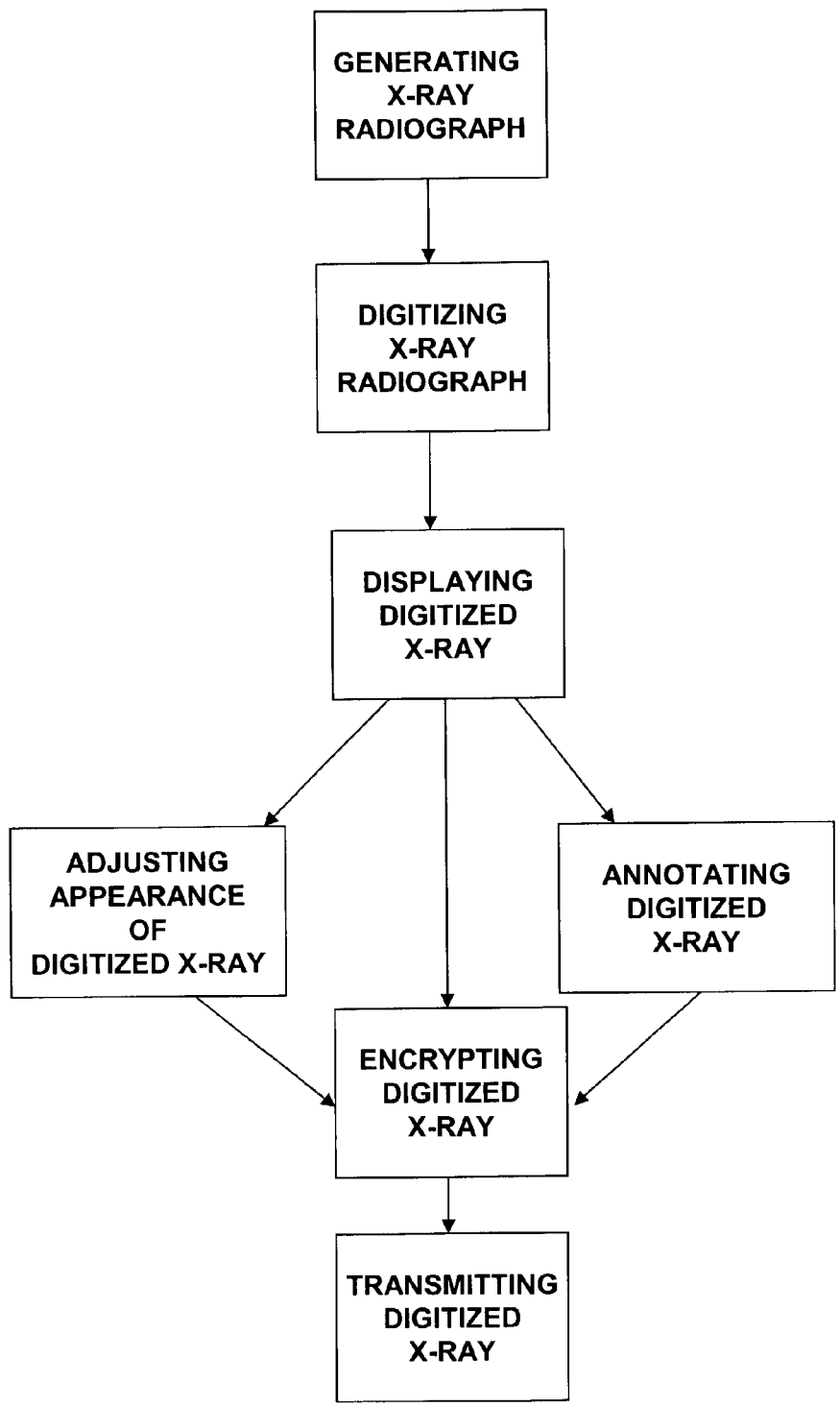
FIG. 2 is a flow chart depicting a method according to one embodiment of the presently claimed invention.

FIG. 2 depicts a flow chart of a method according to one embodiment of the present invention. As shown in FIG. 2, an x-ray processor, which can be a conventional x-ray machine, generates an x-ray radiograph. A digitizer, such as a digital camera, converts the existing x-ray radiograph into a digital image capable of being read by a computer. The digital image is sent to a computer and displayed on a monitor. Optionally, certain features of the digital image, such as brightness and contrast, may be adjusted on the computer monitor and annotations regarding areas of interest may be made. Encryption of the digital image or establishment of a virtual privacy network follows. Thereafter, transmission of the digital image to at one or more authorized recipients occurs. Under these circumstances, access by unwanted recipients should be precluded.

Variations, modifications and other implementations of what is described herein will occur to those of ordinary skill in the art without departing from the spirit and scope of the invention. Accordingly, the invention is in no way limited by the preceding illustrative description.

I claim:

1. A transmission method comprising the steps of:
generating a digital image of an x-ray radiograph;
encrypting the digital image of the x-ray radiograph to create an encrypted digital image; and
transmitting the encrypted digital image
wherein the digital image comprises multiple digital images, the x-ray radiograph comprises multiple x-ray radiographs and the encrypted digital image comprises multiple encrypted digital images.

2. A transmission method comprising the steps of:
generating a digital image of an x-ray radiograph;
encrypting the digital image of the x-ray radiograph to create an encrypted digital image;
transmitting the encrypted digital image; and
making annotations on the digital image of the x-ray radiograph.

3. A transmission method comprising the steps of
generating a digital image of an x-ray radiograph;
establishing a virtual private network; and
transmitting the digital image of the x-ray radiograph over the virtual private network.

4. The method of claim 3, further comprising establishing one or more authorized intended recipients before the transmitting step.

5. The method of claim 3, further comprising limiting access to the digital image to one or more authorized intended recipients.

6. The method of claim 3, further comprising manipulating an image feature of the digital image of the x-ray radiograph.

7. The method of claim 3, wherein the digital image comprises multiple digital images and the x-ray radiograph comprises multiple x-ray radiographs.

8. The method of claim 3, further comprising providing notice to a human subject of use or transmission of the digital image for a specified purpose.

9. The method of claim 3, further comprising requesting permission from a human subject to use or transmit the digital image of the x-ray radiograph.

10. A transmission method comprising the steps of:
generating a digital image of an x-ray radiograph showing features of a human subject;
establishing one or more authorized intended recipients for transmission of the digital image of the x-ray radiograph;
providing written notice to the human subject concerning the identity of the one or more authorized intended recipients; and
transmitting the digital image of the x-ray radiograph.

11. The method of claim 10, further comprising limiting access to the digital image to the one or more authorized intended recipients.

12. The method of claim 10, further comprising manipulating an image feature of the x-ray radiograph.

13. The method of claim 10, wherein the digital image comprises multiple digital images and the x-ray radiograph comprises multiple x-ray radiographs.

14. The method of claim 10, further comprising providing notice to the human subject of use or transmission of the digital image for a specified purpose.

15. The method of claim 10, further comprising requesting permission from the human subject to use or transmit the digital image of the x-ray radiograph.

* * * * *